United States Patent
Tsukano et al.

(10) Patent No.: US 10,211,753 B2
(45) Date of Patent: Feb. 19, 2019

(54) POWER CONVERSION DEVICE AND AIR-CONDITIONING APPARATUS

(71) Applicant: Mitsubishi Electric Corporation, Tokyo (JP)

(72) Inventors: Keiwa Tsukano, Tokyo (JP); Shinsaku Kusube, Tokyo (JP); Takahiko Kobayashi, Tokyo (JP); Yoshihiro Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/060,986

(22) PCT Filed: Feb. 10, 2016

(86) PCT No.: PCT/JP2016/054035
§ 371 (c)(1),
(2) Date: Jun. 11, 2018

(87) PCT Pub. No.: WO2017/138130
PCT Pub. Date: Aug. 17, 2017

(65) Prior Publication Data
US 2018/0367059 A1 Dec. 20, 2018

(51) Int. Cl.
*H01L 23/34* (2006.01)
*H02M 7/42* (2006.01)
(Continued)

(52) U.S. Cl.
CPC .................. *H02M 7/42* (2013.01); *F24F 1/24* (2013.01); *F24F 11/89* (2018.01); *F24F 13/20* (2013.01);
(Continued)

(58) Field of Classification Search
CPC . H02M 1/4225; H01F 2027/406; H01L 23/34
(Continued)

(56) References Cited

U.S. PATENT DOCUMENTS 5,793,623 A * 8/1998 Kawashima ........ H02M 1/4225
363/36
8,179,705 B2 * 5/2012 Chapuis .................... H02J 1/08
323/266
(Continued)

FOREIGN PATENT DOCUMENTS

| JP | 2010-172183 A | 8/2010 |
| JP | 5516602 B2 | 6/2014 |
| WO | 2010/146689 A1 | 12/2010 |

OTHER PUBLICATIONS

International Search Report of the International Searching Authority dated Apr. 26, 2016 for the corresponding International application No. PCT/JP2016/054035 (and English translation).

*Primary Examiner* — Gary Nash
(74) *Attorney, Agent, or Firm* — Posz Law Group, PLC

(57) ABSTRACT

Provided is a power conversion device including: a step-up converter unit, including a reactor to which a DC voltage is to be input, a switching element connected to the reactor in parallel, and a backflow prevention element connected to the reactor in series; a smoothing capacitor configured to smooth an output voltage from the step-up converter unit; an inverter unit configured to convert the output voltage smoothed in the smoothing capacitor into an AC voltage; a dew condensation state detection unit configured to detect a state of dew condensation, which occurs due to a cooler configured to cool the step-up converter unit and the inverter unit; and a control unit configured to control an operation of the step-up converter unit, wherein the control unit includes: a determination unit configured to determine the state of dew condensation detected by the dew condensation state detection unit; and a step-up control unit configured to control a step-up operation of the step-up converter unit based on a result of determination made by the determination unit.

9 Claims, 3 Drawing Sheets

(51) Int. Cl.
*F24F 1/24* (2011.01)
*F24F 13/20* (2006.01)
*H02M 7/00* (2006.01)
*F24F 11/89* (2018.01)
*F24F 110/20* (2018.01)

(52) U.S. Cl.
CPC ......... H02M 7/003 (2013.01); *F24F 2110/20* (2018.01)

(58) Field of Classification Search
USPC ........................ 363/34, 35, 78, 79, 124, 141
See application file for complete search history.

(56) References Cited

U.S. PATENT DOCUMENTS

| | | | |
|---|---|---|---|
| 2008/0130336 A1* | 6/2008 | Taguchi | H02M 1/4225 363/125 |
| 2012/0088172 A1* | 4/2012 | Kaneko | H01M 8/04007 429/429 |
| 2012/0255318 A1* | 10/2012 | Kido | F25B 31/006 62/126 |

* cited by examiner

POWER CONVERSION DEVICE AND AIR-CONDITIONING APPARATUS

CROSS REFERENCE TO RELATED APPLICATION

This application is a U.S. national stage application of PCT/JP2016/054035 filed on Feb. 10, 2016, the contents of which are incorporated herein by reference.

TECHNICAL FIELD

The present invention relates to a power conversion device and an air-conditioning apparatus, which are configured to eliminate dew condensation that may occur due to a cooling operation of a cooler.

BACKGROUND ART

Hitherto, there is known an air-conditioning apparatus including a cooler configured to cool a power element used for a power conversion device configured to drive a compressor or other devices with refrigerant flowing through a refrigerant circuit, and other components. When the power element is cooled with use of the cooler, a temperature around the cooler is liable to decrease. Therefore, around the cooler, water in air sometimes condenses to cause dew condensation. When dew condensation occurs around the cooler, there is a fear in that dew condensation water may adhere to the power element and other electric and electronic components such as a capacitor and a reactor to cause a failure of the electric and electric component.

In Patent Literature 1, there is disclosed a refrigeration apparatus configured to intentionally cause a component to be cooled by the cooler to generate heat. According to Patent Literature 1, an operation of an inverter circuit directly connected to a load, for example, a motor for a compressor, is controlled. In Patent Literature 1, a switching frequency, a switching loss, or a conduction loss of a switching element constructing the power element of the inverter circuit are increased to cause the power element to generate heat. The switching loss is increased by increasing a base resistance of the switching element, a capacitor capacity of a base circuit, or other values. Further, the conduction loss is increased by increasing a current flowing through the inverter circuit.

CITATION LIST

Patent Literature

Patent Literature 1: Japanese Patent No. 5516602

SUMMARY OF INVENTION

Technical Problem

However, the refrigeration apparatus disclosed in Patent Literature 1 controls the operation of the inverter circuit, which is directly connected to the load. Thus, characteristics of the load undesirably change.

The present invention has been made to solve the problems described above, and has an object to provide a power conversion device and an air-conditioning apparatus, which are capable of eliminating dew condensation caused by a cooler while reducing effects on characteristics of a load.

Solution to Problem

According to one embodiment of the present invention, there is provided a power conversion device including: a step-up converter unit, which includes: a reactor to which a DC voltage is to be input, a switching element connected to the reactor in parallel; and a backflow prevention element connected to the reactor in series; a smoothing capacitor, which is configured to smooth an output voltage from the step-up converter unit; an inverter unit, which is configured to convert the output voltage smoothed in the smoothing capacitor into an AC voltage; a dew condensation state detection unit, which is configured to detect a state of dew condensation, which occurs due to a cooler configured to cool the step-up converter unit and the inverter unit; and a control unit, which is configured to control an operation of the step-up converter unit, wherein the control unit includes: a determination unit, which is configured to determine the state of dew condensation detected by the dew condensation state detection unit; and a step-up control unit, which is configured to control a step-up operation of the step-up converter unit based on a result of determination made by the determination unit.

Advantageous Effects of Invention

According to one embodiment of the present invention, the step-up control unit controls the step-up operation of the step-up converter unit. In this manner, a loss is generated in the reactor, and hence the step-up converter unit generates heat. In this case, the step-up converter unit is connected to the load via the smoothing capacitor and the inverter unit. Therefore, even when the step-up operation is performed in the step-up converter unit, a voltage output to the load is further controlled by the smoothing capacitor and the inverter unit. Therefore, even when the step-up operation of the step-up converter unit is controlled, the effects thereof on characteristics of the load are small. In this manner, the power conversion device is capable of eliminating the dew condensation caused by the cooler while reducing the effects on the characteristics of the load.

DESCRIPTION OF EMBODIMENT

Embodiment 1

Figure 1:
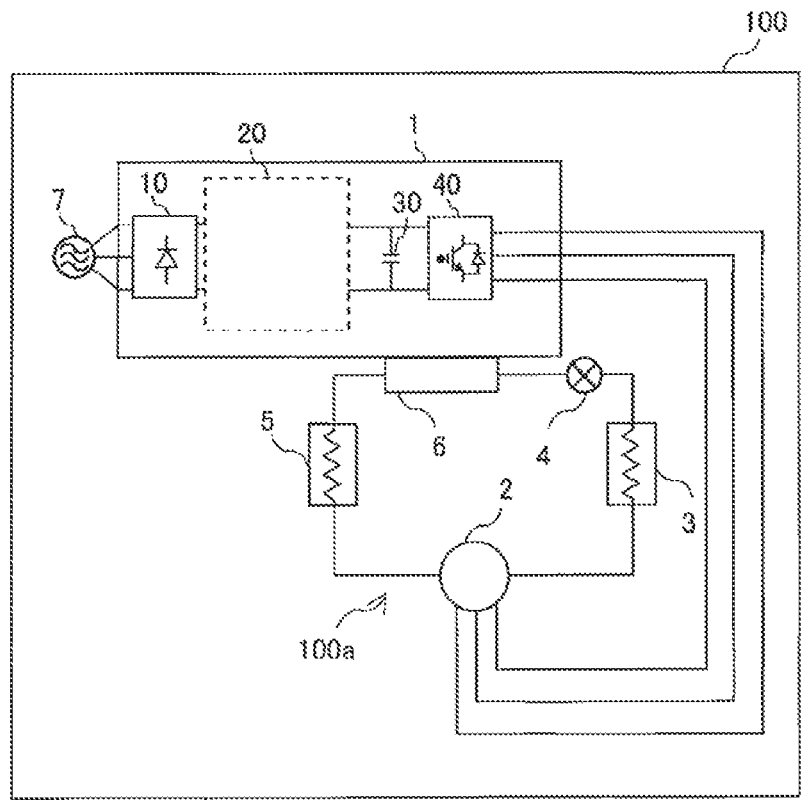
FIG. 1 is a circuit diagram for illustrating an air-conditioning apparatus (100) according to Embodiment 1 of the present invention.

Now, a power conversion device and an air-conditioning apparatus according to embodiments of the present invention is described referring to the drawings. FIG. 1 is a circuit diagram for illustrating an air-conditioning apparatus 100 according to Embodiment 1 of the present invention. Referring to FIG. 1, the air-conditioning apparatus 100 is described. As illustrated in FIG. 1, the air-conditioning apparatus 100 includes a refrigerant circuit 100a and a power conversion device 1. The refrigerant circuit 100a includes a compressor 2, a condenser 3, an expansion unit 4, a cooler 6, and an evaporator 5 connected to one another by pipes, and allows refrigerant to flow therethrough.

The compressor 2 is configured to compress the refrigerant. The condenser 3 is configured to exchange heat between the refrigerant and a heat medium to condense the refrigerant. The expansion unit 4 is configured to expand and decompress the refrigerant. The cooler 6 is mounted to the power conversion device 1, and is configured to cool the power conversion device 1 with the refrigerant. The evaporator 5 is configured to exchange heat between the refrigerant and a heat medium to evaporate the refrigerant. The power conversion device 1 is connected to a three-phase AC power supply 7 and a motor (not shown) for the compressor 2 being a load, and is configured to supply electric power supplied from the AC power supply 7 to the load after conversion into predetermined electric power.

Figure 2:
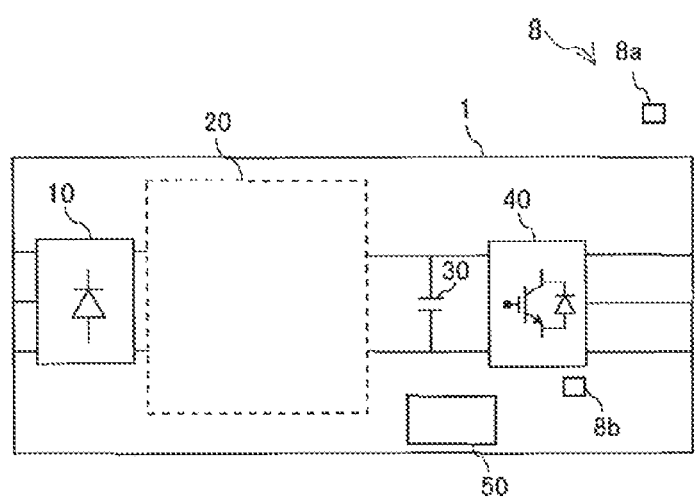
FIG. 2 is a circuit diagram for illustrating a power conversion device (1) according to Embodiment 1 of the present invention.

FIG. 2 is a circuit diagram for illustrating the power conversion device 1 according to Embodiment 1 of the present invention. As illustrated in FIG. 2, the power conversion device 1 includes a rectifier 10, a step-up converter unit 20, a smoothing capacitor 30, an inverter unit 40, a dew condensation state detection unit 8, and a control unit 50. The rectifier 10 is configured to rectify an AC voltage supplied from the AC power supply 7. The rectifier 10 is configured to convert an AC voltage supplied from, for example, the three-phase AC power supply 7 into a DC voltage and is, for example, a three-phase full-wave rectifier including six bridge-connected diodes. In this case, the AC voltage supplied from the AC power supply 7 is, for example, 200 V or 400 V.

Figure 3:
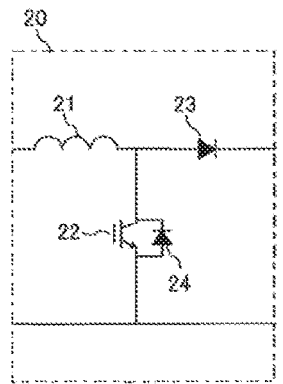
FIG. 3 is a circuit diagram for illustrating a step-up converter unit (20) in Embodiment 1 of the present invention.

FIG. 3 is a circuit diagram for illustrating the step-up converter unit 20 in Embodiment 1 of the present invention. As illustrated in FIG. 3, the step-up converter unit 20 is configured to step up an input voltage rectified by the rectifier 10, and includes a reactor 21, a switching element 22, a backflow prevention element 23, and a sub-backflow prevention element 24. The reactor 21 is connected to an output end of the rectifier 10, and a DC voltage is input thereto. The switching element 22 is connected to the reactor 21 in parallel and is a semiconductor element, for example, an IGBT. The switching element 22 may be a MOSFET instead. Further, as the switching element 22, a silicon (Si) element may be used, or a wide bandgap semiconductor having a larger bandgap than that of the silicon (Si) element, such as a silicon carbide (SiC) element, a gallium nitride (GaN) element, or a diamond (C) element, may be used.

The backflow prevention element 23 is connected to the reactor 21 in series, and is configured to prevent a current from flowing from the smoothing capacitor 30 side to the reactor 21 side. The backflow prevention element 23 may be an element, for example, a photo recovery diode. The sub-backflow prevention element 24 connects a collector terminal and an emitter terminal of the switching element 22, and is configured to prevent the current from flowing from the collector terminal side to the emitter terminal side.

The step-up converter unit 20 steps up a DC bus voltage from the rectifier 10 to a target voltage by changing an on-duty ratio of the switching element 22 to regulate a step-up amount, and then supplies the DC bus voltage to the inverter unit 40. In this case, the on-duty ratio is a ratio of time to energize the switching element 22. As the on-duty ratio increases, the step-up amount increases. In the step-up converter unit 20, a switching count varies depending on a carrier frequency of the switching element 22.

The motor for the compressor 2 being the load is connected to an output end of the inverter unit 40, and a required voltage varies depending on a rotation speed of the motor. The step-up converter unit 20 steps up the voltage to the voltage required by the motor to improve performance of the motor. The cooler 6 cools the step-up converter unit 20. In particular, the reactor 21 is provided below the cooler 6. The step-up converter unit 20 may be a power module obtained by modularizing a combination of a plurality of switching elements 22 and backflow prevention elements 23. The step-up converter unit 20 may be a different type of step-up circuit, for example, a multilevel converter without, being limited to the step-up chopper described above.

As illustrated in FIG. 2, the smoothing capacitor 30 is connected to the step-up converter unit 20 in parallel, and is configured to smooth an output voltage from the step-up converter unit 20. The inverter unit 40 is configured to convert the output voltage smoothed in the smoothing capacitor 30 into an AC voltage. The motor for the compressor 2 is connected to the output end of the inverter unit 40, and the AC voltage converted by the inverter unit 40 to have a predetermined frequency is supplied to the motor. In this manner, the motor is rotationally driven at a suitable frequency. The cooler 6 cools the inverter unit 40. The inverter unit 40 may be a power module obtained through modularization.

The dew condensation state detection unit 8 is configured to detect a state of dew condensation caused by the cooler 6. When the step-up converter unit 20 and the inverter unit 40 are cooled by the cooler 6, a temperature around the cooler 6 is liable to decrease. Therefore, water in air is sometimes condensed to cause dew condensation around the cooler 6. In this case, the "dew condensation" means water drops generated when a water vapor exceeding a saturated vapor amount that can be contained in the air is present. The saturated vapor amount depends on a temperature, and the saturated vapor amount increases as the temperature increases.

In Embodiment 1, the dew condensation state detection unit 8 includes an outside-air temperature sensor 8a and a module temperature sensor 8b. The outside-air temperature sensor 8a is configured to detect a temperature of outside air. The module temperature sensor 8b is configured to detect a temperature of the step-up converter unit 20 and a temperature of the inverter unit 40. When at least one of the step-up converter unit 20 and the inverter unit 40 is a power module obtained through modularization, the module temperature sensor 8b is provided to the power module. Further, the dew condensation state detection unit 8 may be a dew condensation sensor configured to directly detect a dew condensation amount.

Figure 4:
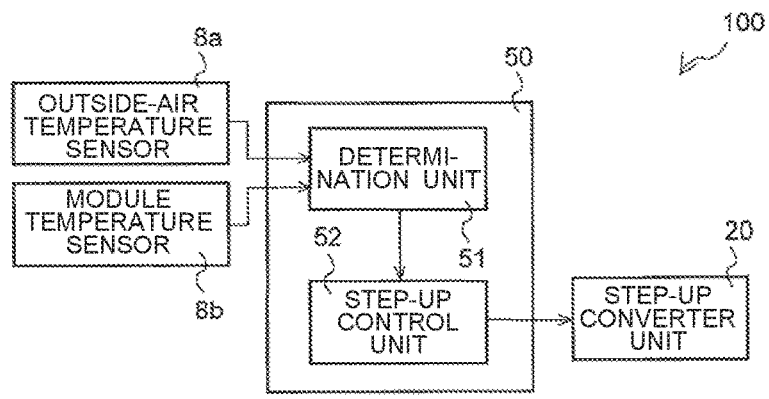
FIG. 4 is a block diagram for illustrating a control unit (50) of the power conversion device (1) according to Embodiment 1 of the present invention.

FIG. 4 is a block diagram for illustrating the control unit 50 of the power conversion device 1 according to Embodiment 1 of the present invention. As illustrated in FIG. 4, the control unit 50 is configured to control an operation of the step-up converter unit 20, and includes a determination unit 51 and a step-up control unit 52.

The determination unit 51 is configured to determine the state of the dew condensation detected by the dew condensation state detection unit 8. In Embodiment 1, the determination unit 51 determines whether or not a difference obtained by subtracting the temperature detected by the module temperature sensor 8*b* from the temperature detected by the outside-air temperature sensor 8*a* is equal to or smaller than a difference threshold value. When the difference is equal to or smaller than the difference threshold value, it is determined that there is a possibility of occurrence of the dew condensation. The difference threshold value may be zero degrees Celsius, or may be a temperature higher than zero degrees Celsius.

The determination unit 51 may determine whether or not a time rate of change of the difference is equal to or smaller than a change rate threshold value. In this case, when the time rate of change of the difference is equal to or smaller than the change rate threshold value, it is determined that there is a possibility of occurrence of dew condensation. Further, the determination unit 51 may determine whether or not the dew condensation amount detected by the dew condensation sensor is equal to or larger than a dew condensation amount threshold value.

Still further, the determination unit 51 may determine whether or not a dew point difference obtained by subtracting the temperature detected by the module temperature sensor 8*b* from a dew point temperature is equal to or smaller than a dew point difference threshold value. In this case, the dew point temperature is calculated by the control unit 50 from the temperature detected by the outside-air temperature 8*a* and a relative humidity. The relative humidity is an index indicative of a ratio of an actual vapor amount. When the dew point difference is equal to or smaller than the dew point difference threshold value, it is determined that there is a possibility of occurrence of dew condensation. The dew point difference threshold value may be zero degrees Celsius, or may be a temperature higher than zero degrees Celsius. The determination unit 51 may determine whether or not a time rate of change of the dew point difference is equal to or smaller than a change rate threshold value. In this case, when the time rate of change of the dew point difference is equal to or smaller than the change rate threshold value, it is determined that there is a possibility of occurrence of dew condensation.

The step-up control unit 52 is configured to control a step-up operation of the step-up converter unit 20 based on a result of determination made by the determination unit 51. After dew condensation occurs around the cooler 6, there is a fear in that dew condensation water may adhere to the step-up converter unit 20 and the inverter unit 40 to cause failures of the step-up converter unit 20 and the inverter unit 40. Therefore, when there is a possibility of occurrence of dew condensation, the occurrence of dew condensation is required to be suppressed.

In Embodiment 1, when it is determined by the determination unit 51 that the difference obtained by subtracting the temperature detected by the module temperature sensor 8*b* from the temperature detected by the outside-air temperature sensor 8*a* is equal to or larger than the difference threshold value, the step-up control unit 52 controls the step-up operation of the step-up converter unit 20. In this case, the step-up control unit 52 increases the on-duty ratio of the switching element 22. As a result, the step-up amount is increased to increase a heat loss in the reactor 21. The dew condensation is eliminated by intentionally causing the step-up converter unit 20 to generate heat in this manner.

Further, a module loss is generated by the step-up operation of the step-up converter unit 20. Even with the heat generated at this time, the dew condensation is eliminated. The step-up amount is suitably set based on an experiment conducted in accordance with driving conditions of the step-up converter unit 20. In this case, the step-up amount is set to a value that allows a state in which dew condensation no longer occurs to be achieved. The step-up amount is gradually increased until the state in which dew condensation no longer occurs is achieved. A temperature rise value for the step-up amount or for an increase amount in step-up amount may be obtained in advance through an experiment or other methods to be stored in the control unit 50 being a microcomputer or other components as a table. As a result, the step-up amount can be calculated based on the temperature rise value required for achieving the state in which the dew condensation no longer occurs.

In this case, the power conversion device 1 monitors a temperature of the reactor 21, a temperature of the switching element 22, and temperatures of other components to suppress thermal breakdown of the reactor 21, the switching element 22, and other components. Further, a step-up amount that does not affect drive performance of the compressor 2 being the load is obtained through an experiment or other methods so that the step-up amount is controlled within a range in which the drive performance of the compressor 2 is not affected. Further, when it is determined that there is a low possibility of occurrence of dew condensation under a state in which the step-up operation is being performed, the step-up control unit 52 stops the step-up operation. In this manner, a loss of the entire power conversion device 1 can be reduced.

Further, the step-up control unit 52 may increase the carrier frequency of the step-up converter unit 20. In this manner, the switching count of the switching element 22 increases to increase the heat loss in the reactor 21. Further, a switching loss of the switching element 22 increases. The dew condensation is eliminated by intentionally causing the step-up converter unit 20 to generate heat in this manner.

The temperature rise value for the carrier frequency or an increase amount in carrier frequency may be obtained in advance through an experiment or other methods to be stored in the control unit 50 being the microcomputer or other components as a table. In this manner, the carrier frequency can be calculated based on the temperature rise value required for achieving the state in which the dew condensation no longer occurs. Further, the carrier frequency that does not affect the drive performance of the compressor 2 being the load is obtained so that the carrier frequency is controlled within a range in which the drive performance of the compressor 2 is not affected.

Further, the step-up control unit 52 may start the step-up operation of the step-up converter unit 20 when the step-up operation of the step-up converter unit 20 is in a stopped state. In this manner, the heat loss in the reactor 21 increases.

Next, an operation of the air-conditioning apparatus 100 is described. The refrigerant sucked into the compressor 2 is compressed by the compressor 2 to be discharged in a high-temperature and high-pressure gas state. The refrigerant in the high-temperature and high-pressure gas state discharged from the compressor 2 flows into the condenser 3 to exchange heat with the heat medium to be condensed and liquified in the condenser 3. The condensed refrigerant in a liquid state flows into the expansion unit 4 to be expanded and decompressed in the expansion unit 4 into a two-phase gas-liquid state. The refrigerant in the two-phase gas-liquid state flows into the cooler 6. In this case, the refrigerant cools the step-up converter unit 20 and the inverter unit 40, which are mounted to the cooler 6, via the cooler 6. Then, the refrigerant heated through heat exchange with the step-up converter unit 20 and the inverter unit 40 in the cooler 6 flows into the evaporator 5. The refrigerant exchanges heat with the heat medium to be evaporated and gasified in the evaporator 5. The evaporated refrigerant in the gas state is sucked into the compressor 2.

Figure 5:
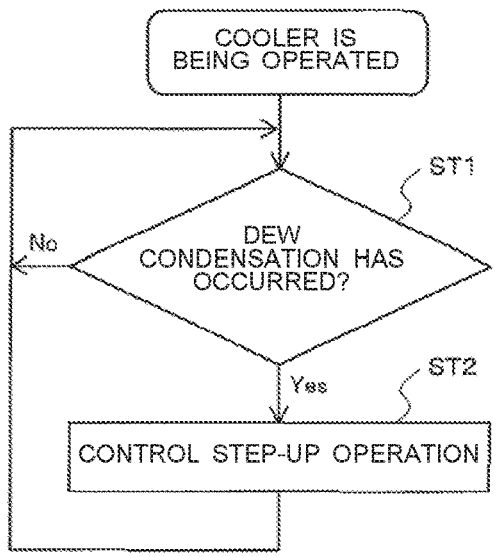
FIG. 5 is a flowchart for illustrating an operation of the power conversion device (1) according to Embodiment 1 of the present invention.
Figure 6:
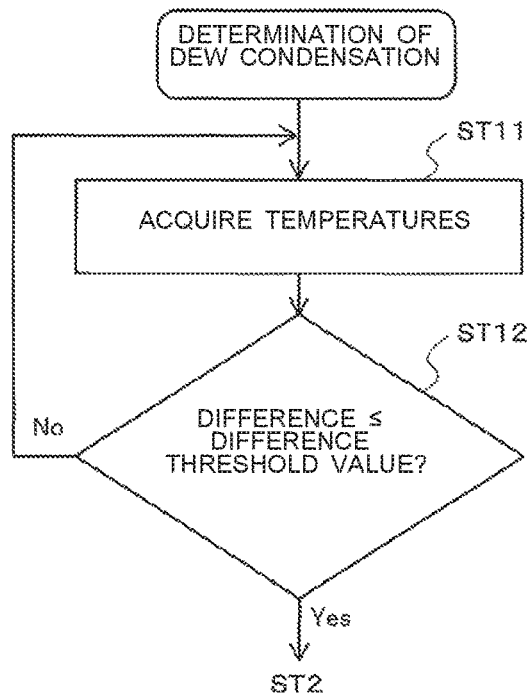
FIG. 6 is a flowchart for illustrating the operation of the power conversion device (1) according to Embodiment 1 of the present invention.
Figure 7:
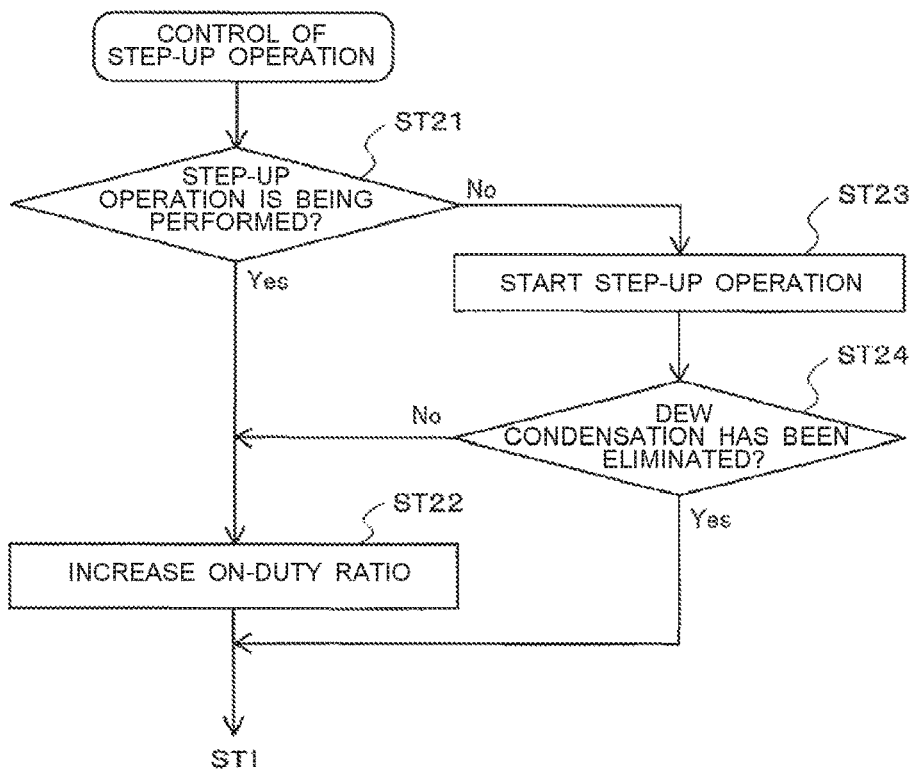
FIG. 7 is a flowchart for illustrating the operation of the power conversion device (1) according to Embodiment 1 of the present invention.

FIG. 5, FIG. 6, and FIG. 7 are flowcharts for illustrating an operation of the power conversion device 1 according to Embodiment 1 of the present invention. FIG. 6 is a flowchart for specifically illustrating Step ST1 of FIG. 5, and FIG. 7 is a flowchart for specifically illustrating Step ST2 of FIG. 5. An operation of the control unit 50 is now described. As illustrated in FIG. 5, when the cooler 6 is being operated, the state of dew condensation detected by the dew condensation state detection unit 8 is determined by the determination unit 51 (Step ST1). As illustrated in FIG. 6, the temperature detected by the outside-air temperature sensor 8a and the temperatures detected by the module temperature sensor 8b are first acquired (Step ST11).

Next, it is determined by the determination unit 51 whether or not the difference obtained by subtracting the temperature detected in the module temperature sensor 8b from the temperature detected in the outside-air temperature sensor 8a is equal to or smaller than the difference threshold value (Step ST12). When it is determined that the difference is larger than the difference threshold value (No in Step ST12), the processing returns to Step ST11. Meanwhile, when it is determined that the difference is equal to or smaller than the difference threshold value (Yes in Step ST12), the processing proceeds to Step ST2 of FIG. 5.

In Step ST2, as illustrated in FIG. 7, it is first determined whether or not the step-up operation of the step-up converter unit 20 is being performed (Step ST21). When the step-up operation of the step-up converter unit 20 is being performed (Yes in Step ST21), the on-duty ratio of the switching element 22 is increased by the step-up control unit 52 (Step ST22). In this manner, the step-up amount of the step-up converter unit 20 increases to increase the heat loss in the reactor 21. In this manner, the dew condensation is eliminated by intentionally causing the step-up converter unit 20 to generate heat. Then, the processing returns to Step ST1 of FIG. 5.

Meanwhile, when the step-up operation of the step-up converter unit 20 is in the stopped state (No in Step ST21), the step-up operation of the step-up converter unit 20 is started by the step-up control unit 52 (Step ST23). In this manner, the heat loss in the reactor 21 increases. As described above, the dew condensation can be eliminated by intentionally causing the step-up converter unit 20 to generate heat. Next, it is determined whether or not the dew condensation has been eliminated (Step ST24). When the dew condensation has been eliminated (Yes in Step ST24), the processing returns to Step ST1 of FIG. 5. When the dew condensation has not been eliminated (No in Step ST24), the processing proceeds to Step ST22, in which the on-duty ratio of the switching element 22 is increased. In this manner, the step-up amount of the step-up converter unit 20 further increases to further increase the heat loss in the reactor 21. As described above, the dew condensation is eliminated by intentionally causing the step-up converter unit 20 to generate heat.

According to Embodiment 1, the step-up control unit 52 controls the step-up operation of the step-up converter unit 20. As a result, the loss is generated in the reactor 21, and hence the step-up converter unit 20 generates heat. As described above, the power conversion device 1 eliminates the dew condensation by intentionally causing the step-up converter unit 20 to generate heat. In this case, the step-up converter unit 20 is connected to the load via the smoothing capacitor 30 and the inverter unit 40. Accordingly, even when the step-up operation is performed in the step-up converter unit 20, the voltage output to the load is further controlled by the smoothing capacitor 30 and the inverter unit 40. Therefore, even when the step-up operation of the step-up converter unit 20 is controlled, effects on the characteristics of the load are small. As described above, the power conversion device 1 can eliminate the dew condensation caused by the cooler 6 while reducing the effects on the characteristics of the load.

Hitherto, there is known an air-conditioning apparatus configured to control a refrigerant flow control unit, for example, an electronic expansion valve, to control an amount of refrigerant flowing through the cooler to eliminate the dew condensation. Further, there is known an air-conditioning apparatus configured to maintain a device stopped state and energize a power element of an inverter unit to cause the power element to generate heat, to thereby eliminate the dew condensation. Still further, there is known an air-conditioning apparatus configured to increase a frequency of the inverter unit so as to increase a rotation speed of the compressor in a stepwise manner to cause the power element of the inverter unit, to thereby generate heat to eliminate the dew condensation, when there is a possibility of occurrence of the dew condensation during a heating operation.

In the related-art air-conditioning apparatus or other apparatus, however, a switching speed of the switching element changes and the electric power to be input to the motor for the compressor increases. This disadvantageously affects operation characteristics of the compressor, performance and conversion efficiency of the inverter unit, and other characteristics. In this manner, a coefficient of performance (COP) during a rated cooling and heating operation and an annual performance factor (APF) throughout a year are affected in a refrigeration cycle. In contrast, in Embodiment 1, the step-up control unit 52 controls the step-up operation of the step-up converter unit 20. Therefore, the power conversion device 1 can eliminate the dew condensation caused by the cooler 6 while reducing the effects on the characteristics of the load.

In this case, the reactor 21 is provided below the cooler 6. Air heated with the heat generated by the reactor 21 has a smaller density than that of air therearound and therefore rises. In Embodiment 1, the cooler 6 is provided above the reactor 21, and hence heat is easily transferred to the cooler 6, and the heat is diffused over a broad range along with the rise. As described above, the reactor 21 is provided below the cooler 6, and hence an iron loss in the reactor 21 can be further increased. Therefore, the heat generation amount of the reactor 21 is further increased to suppress a decrease in temperature of air around the cooler 6. As a result, the dew condensation can be further suppressed. This effect becomes more remarkable as the step-up amount or carrier frequency of the step-up converter unit 20 increases.

The step-up control unit 52 is configured to increase the on-duty ratio of the switching element 22. In this manner, the step-up amount of the step-up converter unit 20 increases to increase the heat loss in the reactor 21. Further, the step-up control unit 52 may increase the carrier frequency of the step-up converter unit 20. In this case, the switching count of the switching element 22 is increased to increase the heat loss in the reactor 21. Further, when the step-up operation of the step-up converter unit 20 is in the stopped state, the step-up control unit 52 starts the step-up operation of the step-up converter unit 20. In this manner, the heat loss in the reactor 21 increases.

The dew condensation state detection unit 8 includes the outside-air temperature sensor 8a configured to detect the temperature of the outside air and the module temperature sensor 8b configured to detect the temperature of the step-up converter unit 20 and the temperature of the inverter unit 40. The determination unit 51 is configured to determine whether or not the difference obtained by subtracting the temperature detected by the module temperature sensor 8b from the temperature detected by the outside-air temperature sensor 8a is equal to or smaller than the difference threshold value. When it is determined by the determination unit 51 that the difference is equal to or smaller than the difference threshold value, the step-up control unit 52 controls the step-up operation of the step-up converter unit 20. In this manner, whether or not the dew condensation occurs can be estimated.

Further, the power conversion device 1 may further include the power module obtained by modularizing at least one of the step-up converter unit 20 and the inverter unit 40, and the module temperature sensor 8b may be provided to the power module. In this case, the module temperature sensor 8b can be assembled during a manufacturing process so as to protect the power module. Therefore, the power module protection and the determination of dew condensation can be both performed by the common module temperature sensor 8b. As a result, the additional module temperature sensor 8b is not required, and hence cost is reduced.

The rectifier 10, the inverter unit 40, and the module temperature sensor 8b may be modularized. Further, the step-up converter unit 20 and the module temperature sensor 8b may be modularized, or all the rectifier 10, the step-up converter unit 20, the inverter unit 40, and the module temperature sensor 8b may be modularized. In this manner, the additional module temperature sensor 8b is not required, and hence the power conversion device 1 can be downsized.

The dew condensation state detection unit 8 is a dew condensation sensor configured to detect the dew condensation amount. The determination unit 51 is configured to determine whether or not the dew condensation amount detected by the dew condensation sensor is equal to or smaller than the dew condensation amount threshold value. When it is determined by the determination unit 51 that the dew condensation amount is equal to or larger than the dew condensation amount threshold value, the step-up control unit 52 may control the step-up operation of the step-up converter unit 20. In this case, the dew condensation can be directly detected, and hence accuracy of detection of the dew condensation is high.

In Embodiment 1, the air-conditioning apparatus 100 includes the refrigerant circuit 100a, which includes the compressor 2, the condenser 3, the expansion unit 4, the cooler 6, and the evaporator 5 connected to one another by the pipes, and is configured to allow the refrigerant to flow therethrough, and the power conversion device 1. In this manner, the step-up converter unit 20 and the inverter unit 40 of the power conversion device 1 can be cooled by the cooler 6.

REFERENCE SIGNS LIST 1 power conversion device 2 compressor 3 condenser 4 expansion unit 5 evaporator 6 cooler 7 AC power supply 8 dew condensation state detection unit 8a outside-air temperature sensor 8b module temperature sensor 10 rectifier 20 step-up converter unit 21 reactor 22 switching element 23 backflow prevention element 24 sub-backflow prevention element 30 smoothing capacitor 40 inverter unit 50 control unit 51 determination unit 52 step-up control unit 100 air-conditioning apparatus 100a refrigerant circuit.

The invention claimed is:

1. A power conversion device, comprising:
 a step-up converter unit, including:
  a reactor to which a DC voltage is to be input;
  a switching element connected to the reactor in parallel; and
  a backflow prevention element connected to the reactor in series;
 a smoothing capacitor configured to smooth an output voltage from the step-up converter unit;
 an inverter unit configured to convert the output voltage smoothed in the smoothing capacitor into an AC voltage;
 a dew condensation state detection unit configured to detect a state of dew condensation, which occurs due to a cooler configured to cool the step-up converter unit and the inverter unit; and
 a control unit configured to control an operation of the step-up converter unit,
 the control unit including:
  a determination unit configured to determine the state of dew condensation detected by the dew condensation state detection unit; and
  a step-up control unit configured to control a step-up operation of the step-up converter unit based on a result of determination made by the determination unit.

2. The power conversion device of claim 1, wherein the reactor is provided below the cooler.

3. The power conversion device of claim 1, wherein the step-up control unit is configured to increase an on-duty ratio of the switching element.

4. The power conversion device of claim 1, wherein the step-up control unit is configured to increase a carrier frequency of the step-up converter unit.

5. The power conversion device of claim 1, wherein, when the step-up operation of the step-up converter unit is in a stopped state, the step-up control unit starts the step-up operation of the step-up converter unit.

6. The power conversion device of claim 1,
 wherein the dew condensation state detection unit includes a dew condensation sensor configured to detect a dew condensation amount,
 wherein the determination unit is configured to determine whether the dew condensation amount detected by the dew condensation sensor is equal to or larger than a dew condensation amount threshold value, and
 wherein, when it is determined by the determination unit that the dew condensation amount is equal to or larger than the dew condensation amount threshold value, the step-up control unit controls the step-up operation of the step-up converter unit.

7. The power conversion device of claim 1,
 wherein the dew condensation state detection unit includes an outside-air temperature sensor configured to detect a temperature of outside air and a module temperature sensor configured to detect a temperature of the step-up converter unit and a temperature of the inverter unit,
 wherein the determination unit is configured to determine whether a difference obtained by subtracting the temperature detected by the module temperature sensor from the temperature detected by the outside-air temperature is equal to or smaller than a difference threshold value, and wherein, when it is determined by the determination unit that the difference is equal to or smaller than the difference threshold value, the step-up control unit controls the step-up operation of the step-up converter unit.

8. The power conversion device of claim 7, further comprising a power module, which is at least one of the step-up converter unit and the inverter unit that is modularized, wherein the module temperature sensor is provided to the power module.

9. An air-conditioning apparatus, comprising:

a refrigerant circuit, which includes a compressor, a condenser, an expansion unit, the cooler, and an evaporator connected to one another by pipes, and is configured to allow refrigerant to flow therethrough; and the power conversion device of claim 1.

* * * * *